United States Patent [19]

Bakholdin et al.

[11] Patent Number: 5,462,402
[45] Date of Patent: Oct. 31, 1995

[54] FLYWHEEL ENERGY STORAGE SYSTEM WITH INTEGRAL MOLECULAR PUMP

[75] Inventors: Daniel Bakholdin, Van Nuys; Robert W. Bosley, Cerritos; Chris C. Pearson, Woodside, all of Calif.

[73] Assignee: Rosen Motors, L.P., Woodland Hills, Calif.

[21] Appl. No.: 199,897

[22] Filed: Feb. 22, 1994

[51] Int. Cl.⁶ ............................................. F01D 1/36
[52] U.S. Cl. ............................................. 415/90
[58] Field of Search ................... 415/90; 74/572, 74/573, 574

[56] References Cited

U.S. PATENT DOCUMENTS 3,993,920  11/1976  Sato ............................ 74/573
4,850,244   7/1989  Eckel et al. .................. 74/572
4,946,345   8/1990  Watanabe et al. ............ 415/90

Primary Examiner—John T. Kwon
Attorney, Agent, or Firm—Sughrue, Mion, Zinn, Macpeak & Seas

[57] ABSTRACT

A flywheel assembly used for mobile energy storage incorporates a molecular pump and an internal chamber containing molecular sieves. The molecular pump shares the shaft, bearings, and motor of the flywheel rotor, and maintains the high vacuum desired in the vicinity of the flywheel rotor. The gases which evolve from the rotor during its operational life are pumped into the chamber containing the molecular sieves where they are adsorbed.

16 Claims, 5 Drawing Sheets

FLYWHEEL ENERGY STORAGE SYSTEM WITH INTEGRAL MOLECULAR PUMP

BACKGROUND OF THE INVENTION

1. Field of the Invention

The present invention relates to the maintenance of a vacuum within the space occupied by a high speed flywheel rotor. More specifically, the present invention relates to the use of a molecular pump incorporated into the flywheel assembly of a flywheel energy storage system to pump gases from a rotor environment into a separate chamber. The separate chamber advantageously can contain molecular sieves for adsorbing gas molecules given off by the rotor.

2. Brief Discussion of Related Art

Modern high strength-to-weight ratio fibers make it possible to construct high energy density flywheels, which, when combined with a high power motor-generators, are an attractive alternative to electrochemical batteries for use as energy buffers in hybrid electric vehicles. A properly designed flywheel system would provide higher energy density, higher power density, higher efficiency, and longer life than a conventional electrochemical battery. Flywheel energy storage systems have even been proposed for use in motor vehicles. U.S. Pat. No. 3,741,034, for example, discloses a flywheel contained in an evacuated sphere which is surrounded by a liquid.

The vehicle environment, however, presents special challenges to successful implementation of a flywheel to motor vehicle applications. For example, to accommodate a rim speed of about 1200 meters per second, a housing containing the flywheel should maintained at a very low pressure, e.g., a pressure in the below 0.001 Pascal, to limit windage losses. While this pressure can be readily achieved before sealing the housing, the fiber composite materials used in the construction of high energy density flywheels have a residual gas evolution rate which make it difficult to achieve this desired degree of pressure, i.e., near vacuum conditions, in a sealed container. Thus, continuous pumping of the evolving gases from the container is often needed. Most often, an external pump is employed to maintain the desired pressure.

U.S. Pat. Nos. 4,023,920, 4,732,529 and 4,826,393 describe various implementations of molecular pumps, which are a class of high vacuum pump wherein the dimensions of the critical elements are comparable to the mean free path of the gas molecules at the pressure of interest. Two types are generally known, a turbo-molecular pump, which is similar in construction to an axial flow compressor in a gas turbine employing interleaved rotor and stator blades, and a molecular drag pump, which uses helical grooves cut in the stator, which, in turn, is disposed in close proximity to a high speed rotor so as to direct gas flow through the pump. It will be appreciated that hybrid molecular pumps which pumps contains separate sections of each of these types or molecular pumps, are also known. More specifically, U.S. Pat. No. 4,023,920 discloses a turbo-molecular pump using magnetic bearings to support the pump rotor at high rotational speeds. U.S. Pat. Nos. 4,732,529 and 4,826,393 disclose hybrid molecular pumps in which a turbo-molecular section is used on the high vacuum input side and a spiral groove drag pump is used on the discharge side.

All of these pumps are designed as self contained systems, each with its own shaft, bearing system and power source, i.e., motor. While this solution is satisfactory for stationary systems, it is more difficult to apply in mobile applications because the space and weight for its implementation is not readily available.

The present invention was, thus, motivated by a desire to correct perceived problems in providing a flywheel-motor-generator energy storage system suitable for moving vehicles.

SUMMARY OF THE INVENTION

The principal purpose of the present invention is to provide a system located within a sealed chamber for maintaining pressure below a predetermined threshold.

An object of the present invention is to provide a pressure regulating system for a flywheel energy storage system disposed within a sealed housing wherein a shaft of the flywheel drives a pump for moving gas molecules from a first chamber to a second chamber within the housing.

Another object of the present invention is to provide a pressure regulating system for a flywheel energy storage system disposed within a sealed housing wherein bearings supporting a shaft of a flywheel supports rotating elements of a pump moving gas molecules from a first chamber to a second chamber within the housing.

Still another object of the present invention is to provide a pressure regulating system for a flywheel energy storage system disposed within a sealed housing wherein a pump for moving gas molecules from a first chamber to a second chamber within the housing is provided at a low incremental cost.

Yet another object of the present invention is to provide a pressure regulating system for a flywheel energy storage system disposed within a sealed housing wherein the pressure is maintained by adsorbing gas molecules moving from a first chamber to a second chamber within the housing on a molecular sieve.

These and other objects, features and advantages according to the present invention are provided by an integral flywheel energy storage system combining a molecular pump into a flywheel energy storage system for vacuum control purposes. The integral flywheel energy storage system includes a sealed housing, a baffle including an orifice dividing the housing into a low pressure first chamber and a relatively high pressure second chamber, a shaft suspended between first bearings located in the first chamber and second bearing in the second chamber, the shaft being disposed within the orifice, a flywheel disposed within the first chamber spinning at high speed, and a molecular pump operatively connected for driving by the shaft for pumping gas molecules from the first chamber to the second chamber. It will be appreciated that other bearing arrangements for operatively supporting the shaft can be used without departing from the spirit and scope of the present invention.

According to one aspect of the invention, the molecular pump is designed into the flywheel assembly so as to permit the high speed motor, shaft, and bearing needed by the molecular pump to be supplied by components already present in the energy storage system. Preferably, the molecular pump transfers the gases evolving from the flywheel rotor and its environs into a separate chamber within the housing of the energy storage system. i.e., contained within the overall vacuum housing. This chamber advantageously may contain so-called molecular sieve materials designed to adsorb the most prevalent of the gases given off by the flywheel rotor. It will be appreciated that other getter materials may also be used throughout the vacuum housing to adsorb trace elements not adsorbed by the molecular sieves.

These and other objects, features and advantages according to the present invention are provided by a molecular pump disposed with a sealed housing of a flywheel energy storage system, wherein the shaft supporting the flywheel powers the molecular pump to maintain gas pressure in the vicinity of the flywheel rotor at or below a predetermined pressure producing negligible drag on the spinning flywheel. It will be appreciated that the molecular pump transfers gas molecules generated by the flywheel rotor material to a receiving chamber which advantageously contains so-called molecular sieves, which adsorb these gas molecules, thereby maintaining the pressure of the receiving chamber at a predetermined second pressure.

These and other objects, features and advantages of the invention are disclosed in or apparent from the following description of preferred embodiments.

BRIEF DESCRIPTION OF THE DRAWINGS

The preferred embodiment is described with reference to the drawings in which like elements are denoted by like numbers and in which.

DESCRIPTION OF THE PREFERRED EMBODIMENTS

Figure 1:
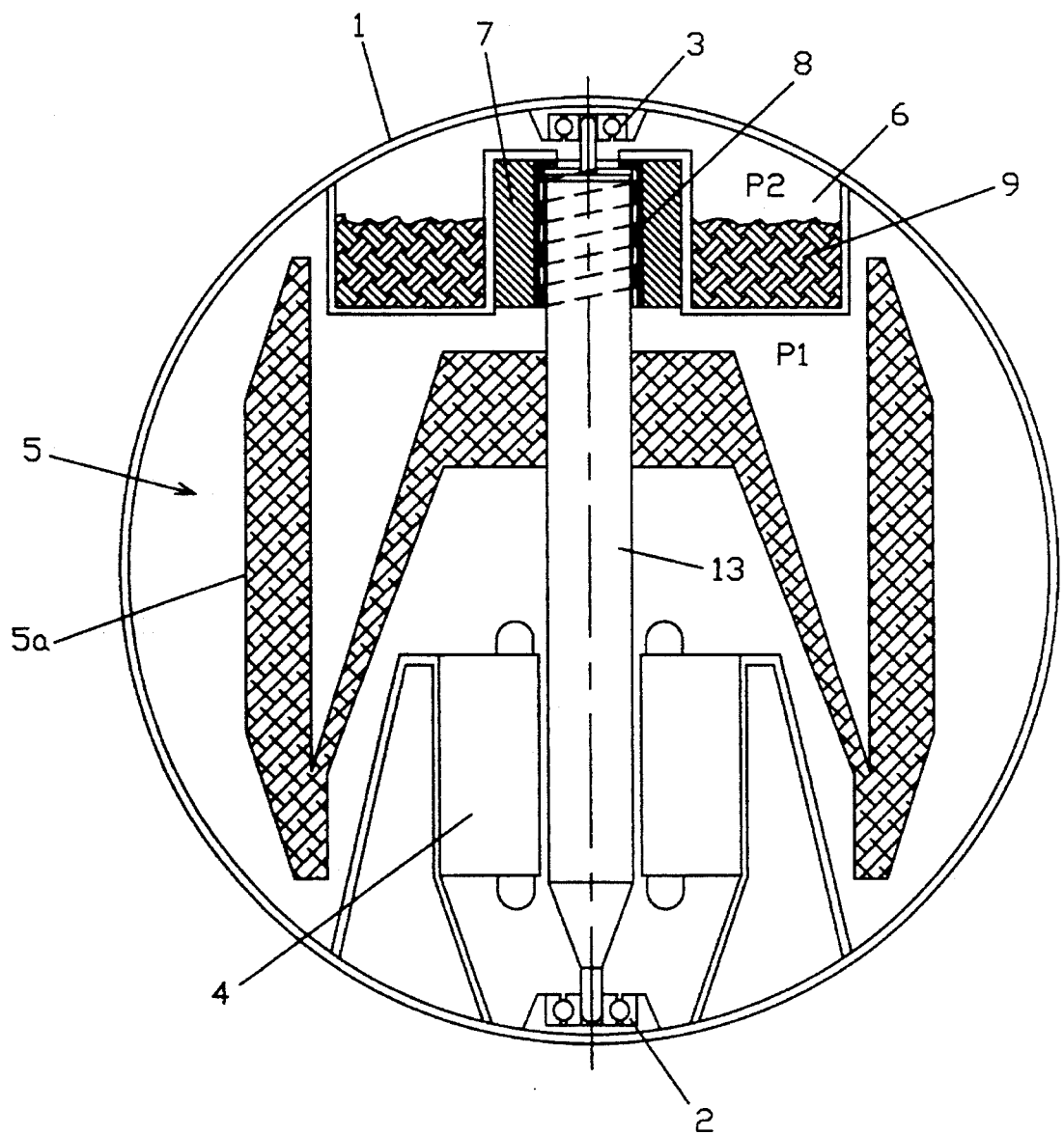
FIG. 1 is a high level schematic drawing illustrating a general arrangement of the flywheel assembly which is useful in explaining the preferred embodiment according to the present invention.

The general arrangement of the inner sphere of the flywheel energy storage system, as shown in FIG. 1, includes a vacuum housing 1 to which are attached a lower bearing 2 and an upper touchdown bearing 3. Housing 1 encloses a motor-generator 4, a flywheel assembly 5 including a flywheel rotor 5a, and a rotor shaft 13. A more detailed description of the components and operation of the flywheel energy storage system is found in co-pending, commonly assigned U.S. application Ser. No. 08/184,361, which is incorporated herein by reference for all purposes. Additional details regarding the flywheel rotor are disclosed in copending, commonly assigned U.S. application Ser. No. 08/181,038, which is also incorporated herein by reference for all purposes.

Preferably, a separate gas storage chamber 6, located proximate to one of the bearings 2, 3 is formed by a baffle plate 6a. It will be appreciated from e.g., FIGS. 2 and 3, that baffle plate 6a includes an orifice 6b for positioning of the shaft 13. Preferably, a radial magnetic bearing 7, supported by baffle plate 6a, surrounds a molecular pump 8, which advantageously may be a molecular drag pump 8. Preferably, gas storage chamber 6 contains a so-called molecular sieve material 9 (hereinafter molecular sieve 9), which will be discussed in greater detail below.

The purpose of the present invention is to maintain a high vacuum in the space in which the flywheel rotor spins so that a negligible drag on the flywheel rotor 5a will be produced. It will be appreciated that at a preferred rim speeds of about 1200 meters per second, the pressure in housing 1 should be less than or equal to 0.001 Pascal. It will also be noted that the fiber composite materials used in the construction of high energy density flywheels, i.e., flywheel assembly 5, have a propensity for residual gas evolution at a rate which make it difficult to achieve this desired degree of vacuum in a sealed container. Therefore, continuous pumping of the evolved gases from the container in conventional systems is often performed using an external pump.

In contrast to these conventional systems, a molecular pump, which is designed into the flywheel assembly 5, and which employs the high speed motor, shaft, and bearing system already present in the flywheel energy storage system, transfers the gases evolving from the flywheel rotor 5a and its environs into a separate chamber 6, which chamber is fully contained within the overall vacuum housing 1. Advantageously, this chamber contains molecular sieves designed to adsorb the most prevalent of the gases generated by flywheel rotor 5a. Preferably, getters are disposed throughout the vacuum housing 1 to absorb trace quantities of gases which are not readily adsorbed by molecular sieve 9.

The flywheel rotor 5a, in an exemplary case, is 12 inches in diameter and has a maximum rotational speed of 8000 radians per second. This rotational speed corresponds to a surface speed of 1200 meters per second, which high speed requires that the surrounding gas pressure be maintained at a pressure of approximately 0.001 Pascal in order to permit a sufficiently long self discharge It will be appreciated that even though the flywheel assembly 5 will be exposed to a high temperature bakeout while vacuum housing 1 is being evacuated prior to being sealed, the high mass of the volatile materials of the composites, particularly the epoxy, employed in the construction of flywheel assembly 5 can be expected to produce a residual gas evolution rate which could exceed the allowable pressure for the housing 1 in a relatively short time. The molecular drag pump 8 advantageously can be used to pump these gases into gas storage chamber 6 where the gases can be adsorbed by the molecular sieves 9. It will be appreciated that the pressure in housing 1 can, thus, be maintained in the vicinity of the flywheel rotor 5a, even though the pressure in the storage chamber 6 may rise as high as one Pascal.

It will also be appreciated that e.g., molecular drag pump 8 would be too expensive an item to be used for maintaining the pressure of housing 1 below its maximum allowable pressure if molecular drag pump 8 were to be provided as a self contained item, principally because of the cost of the high speed bearings and motor required by stand alone molecular pumps of any configuration. By integrating molecular drag pump 8 into the design of flywheel assembly 5, the shaft, bearings, and motor of the flywheel assembly 5 advantageously can be used by molecular drag pump 8. It will be noted that the incremental cost of incorporating the molecular pump into the flywheel energy storage system is very low.

Molecular sieves are adsorbents whose pores are tailored in size to the dimensions of the molecules to be adsorbed. They are available under the trade name MOLSIV from the Union Carbide Corporation. Their ability to adsorb is strongly influenced by pressure, e.g., the adsorption ability is low at pressure normally applied to flywheel assembly 5.

In should also be noted that at the normal operating pressure of gas storage chamber 6, i.e., a pressure $P_2$ which one thousand times higher than a pressure $P_1$ felt throughout housing 1, the molecular sieves 9 are capable of adsorbing all of the gases evolved from flywheel assembly 5. In other words, at the upstream pressure $P_1$ of the molecular drag pump 8, the absorption rate of the target gas molecules produced by the flywheel assembly 5 is low. The adsorption rate increases as the pressure $P_2$ in chamber 6 is increased. Preferably, molecular sieve 9 is selected so that a minimum absorption rate, e.g., the minimum adsorption rate necessary to match the gas molecule evolution rate of flywheel assembly 5, is achieved at a pressure lower than the shut off head of the molecular drag pump 8.

Figure 2:
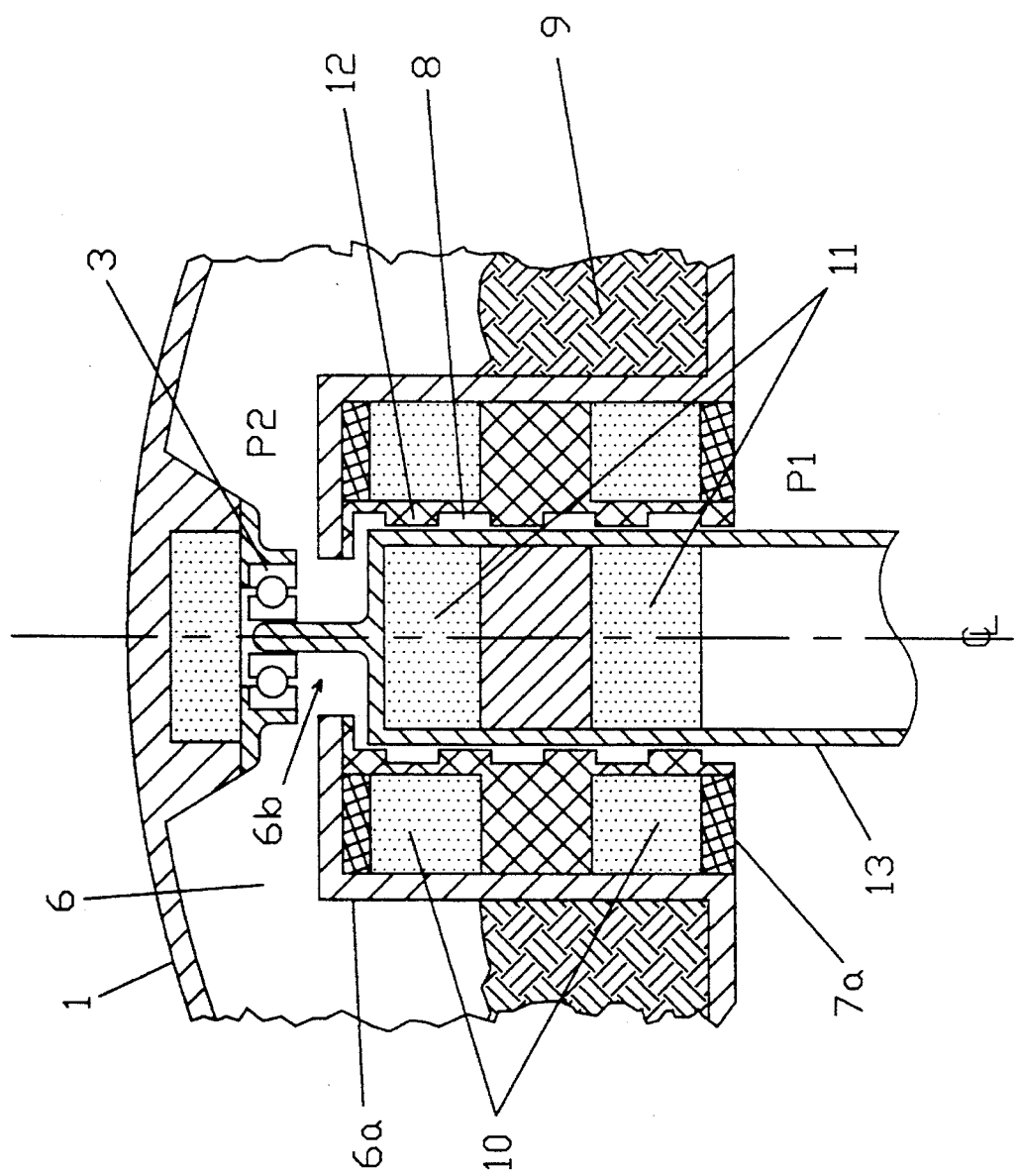
FIG. 2 is a detailed schematic diagram illustrating a molecular drag pump according to the present invention disposed in the radial bearing assembly.

FIG. 2 is a more detailed diagram illustrating the integration of molecular drag pump 8 into radial bearing assembly 7. Preferably, two sets of rotor magnets 11 and stator magnets 10 are used. It will be noted that like poles on the rotor and stator magnets are in close proximity, causing a strong repulsive force which keeps the rotor shaft 13 centered in the stator 7a of assembly 7. A copper sleeve 12 on the stator 7a functions as a damper for any vibrations which may be induced by the high speed rotation. A helical groove 8 cut into copper sleeve 12 provides the flow path for the evolved gases from the high vacuum chamber, at pressure $P_1$, e.g., 0.001 Pascal, to the chamber 6 containing the molecular sieves 9 in which the pressure $P_2$ may be as high as 1.0 Pascal.

Figure 3:
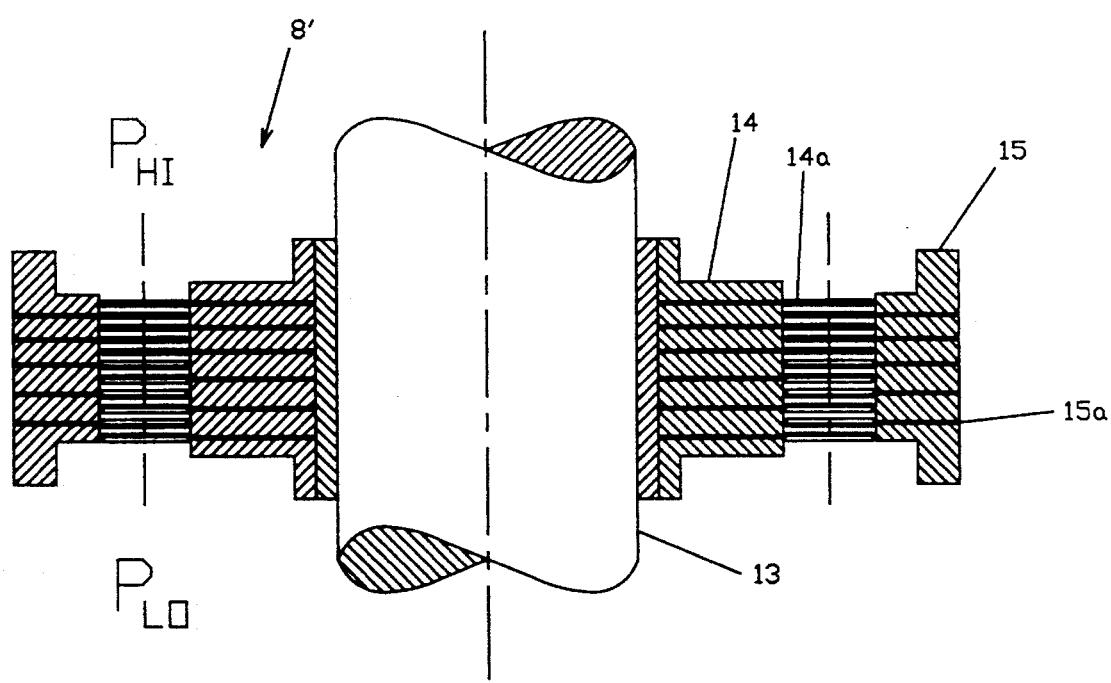
FIG. 3 is a detailed schematic diagram illustrating a turbo-molecular pump according to present invention disposed on the shaft of FIG. 1.

FIG. 3 shows an alternate embodiment of the present invention wherein a turbo-molecular pump 8' is substituted for molecular drag pump 8. The pump 8' consists of a multiplicity of turbine blades 14a connected to the rotor 14 of the pump 8', interleaved with stator blades 15a connected to the stator 15. It will be appreciated that pump 8' serves the same function as pump 8, shown in of FIG. 2, in pumping gases evolving from the flywheel rotor 5a into gas storage chamber 6 containing the molecular sieves 9. Turbo-molecular pump 8' may be used advantageously with some flywheel assembly 5 configurations in which more space is available along the shaft than in the configuration shown in FIG. 1.

Figure 4:
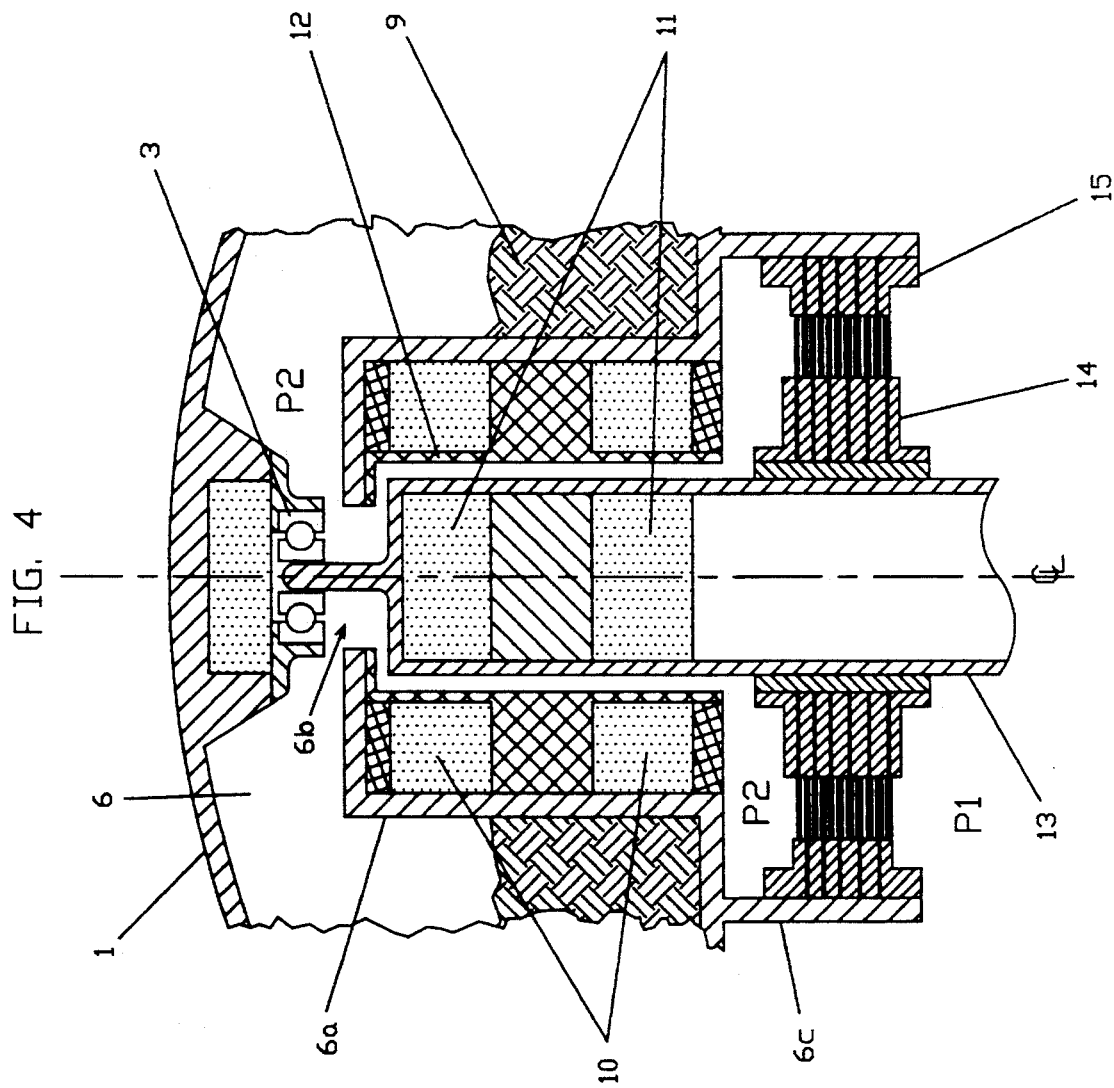
FIG. 4 is a detailed schematic diagram illustrating the mounting of the turbomolecular pump of FIG. 3 disposed in the housing of FIG. 1.

FIG. 4 is a detailed illustration depicting installation of pump 8' into vacuum housing 1 by supporting pump 8' from extension piece 6c of baffle plate 6a.

Figure 5:
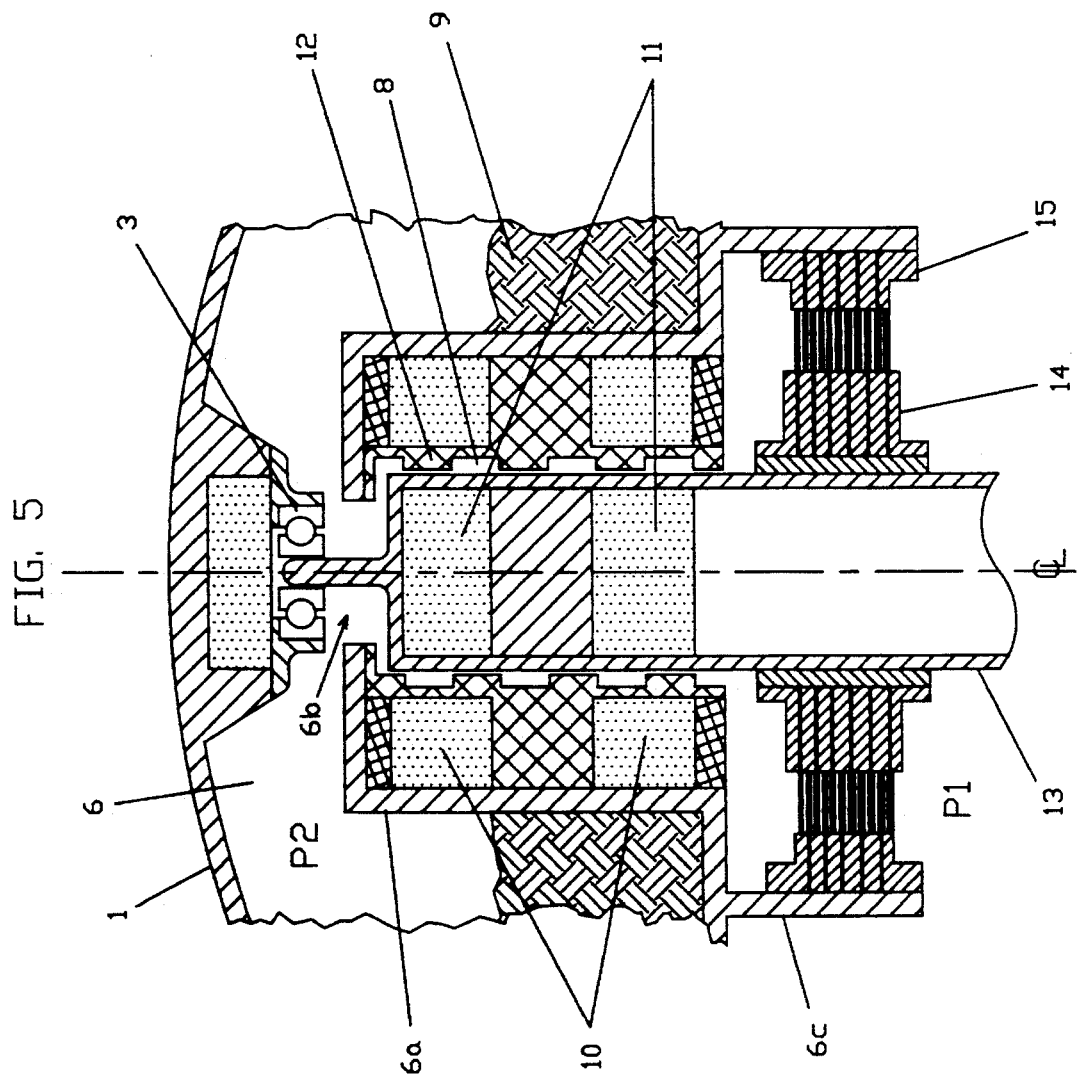
FIG. 5 is a detailed schematic diagram illustrating a hybrid molecular pump according to the present invention disposed in the housing illustrated in FIG. 1.

It will be appreciated that other configurations are possible. For example, FIG. 5 illustrates installation of a hybrid molecular pump 8", which preferably includes a first stage substantially identical to pump 8' and a second stage substantially identical to pump 8.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An integral flywheel energy storage system, comprising:

a sealed housing;

a baffle including an orifice dividing said housing into a low pressure first chamber and a relatively high pressure second chamber;

a shaft suspended between first bearings located in said first chamber and second bearing in said second chamber, said shaft being disposed within said orifice;

a flywheel disposed within the first chamber spinning at high speed; and a molecular pump operatively connected so as to be driven by said shaft for pumping gas molecules from said first chamber to said second chamber.

2. The integral flywheel energy storage system as recited in claim 1, further comprising molecular sieves disposed in said second chamber for adsorbing said gas molecules discharged by said pump.

3. The integral flywheel energy storage system as recited in claim 2, wherein said gas molecules are produced during aging of said flywheel and wherein said molecular sieves are characterized by an affinity for said gas molecules.

4. The integral flywheel energy storage systems as recited in claim 3, wherein said gas molecules are absorbed by said molecular sieves so as to prevent said absorbed gas molecules from contributing to pressure in said second chamber.

5. The integral flywheel energy storage system as recited in claim 1, wherein said molecular pump is a molecular drag pump.

6. The integral flywheel energy storage system as recited in claim 1, wherein said molecular pump is a molecular drag pump including a plurality of spiral grooves formed in a stator.

7. The integral flywheel energy storage system as recited in claim 1, wherein said molecular pump is a turbo-molecular pump.

8. The integral flywheel energy storage system as recited in claim 1, wherein said molecular pump is a hybrid molecular pump, comprising:

a turbo-molecular pump section; and a molecular drag pump section.

9. A pressure maintenance system for a flywheel energy storage system including a sealed housing, a shaft suspended between first and second bearings operatively connect to said housing, said shaft supporting a flywheel rotor spinning at high speed and evolving gas molecules, said system comprising:

a baffle including an orifice dividing the housing into a first chamber and a second chamber being maintained at first and second predetermined pressures, respectively; and a molecular pump operatively connected so as to be driven by said shaft for pumping the gas molecules from said first chamber to said second chamber.

10. The pressure maintenance system as recited in claim 9, further comprising molecular sieves disposed in said second chamber for adsorbing said gas molecules discharged by said pump.

11. The pressure maintenance system as recited in claim 10, wherein said gas molecules are produced by said flywheel as said flywheel ages and wherein said molecular sieves are characterized by an affinity for said gas molecules.

12. The pressure maintenance system as recited in claim 10, wherein said gas molecules of a predetermined size are produced by said flywheel, wherein said gas molecules are absorbed by said molecular sieves characterized by an affinity for said gas molecules, wherein said molecular sieves have a pressure influenced adsorption rate and wherein said predetermined second pressure is between a minimum absorption rate and shut off head of said molecular pump.

13. The pressure maintenance system as recited in claim 9, wherein said molecular pump is a molecular drag pump.

14. The pressure maintenance system as recited in claim 9, wherein said molecular pump is a molecular drag pump including a plurality of spiral grooves formed in a pump stator.

15. The pressure maintenance system as recited in claim 9, wherein said molecular pump is a turbo-molecular pump.

16. The pressure maintenance system as recited in claim 9, wherein said molecular pump is a hybrid molecular pump, comprising a turbo-molecular pump stage and a molecular drag pump stage.

* * * * *